(12) United States Patent
McNulty et al.

(10) Patent No.: US 9,267,430 B2
(45) Date of Patent: Feb. 23, 2016

(54) ENGINE CONTROLLING EMISSIONS DURING TRANSIENT OPERATIONS

(75) Inventors: Michael James McNulty, Lombard, IL (US); Michael A. Majewski, Joliet, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 354 days.

(21) Appl. No.: 13/877,802

(22) PCT Filed: Oct. 4, 2010

(86) PCT No.: PCT/US2010/051260
§ 371 (c)(1),
(2), (4) Date: Apr. 4, 2013

(87) PCT Pub. No.: WO2012/047191
PCT Pub. Date: Apr. 12, 2012

(65) Prior Publication Data
US 2013/0192568 A1 Aug. 1, 2013

(51) Int. Cl.
*B60T 7/12* (2006.01)
*F02B 47/08* (2006.01)
*F02M 25/07* (2006.01)
*F02D 41/40* (2006.01)
*F02D 41/00* (2006.01)
*F02D 41/10* (2006.01)

(52) U.S. Cl.
CPC ............ *F02B 47/08* (2013.01); *F02D 41/0002* (2013.01); *F02D 41/005* (2013.01); *F02D 41/401* (2013.01); *F02M 25/077* (2013.01); *F02D 41/10* (2013.01); *F02D 2250/36* (2013.01); *F02D 2250/38* (2013.01); *F02M 25/0706* (2013.01); *F02M 25/0727* (2013.01); *F02M 25/0756* (2013.01); *Y02T 10/42* (2013.01); *Y02T 10/44* (2013.01); *Y02T 10/47* (2013.01)

(58) Field of Classification Search
CPC .......................... F02D 41/0002; F01D 41/0072
USPC ................................................... 701/103, 108
See application file for complete search history.

(56) References Cited

U.S. PATENT DOCUMENTS

| 6,934,619 | B2 | 8/2005 | Read | |
| 6,973,382 | B2 | 12/2005 | Rodriguez | |
| 2008/0078167 | A1* | 4/2008 | Wang et al. | 60/285 |
| 2013/0192568 | A1* | 8/2013 | McNulty et al. | 123/568.19 |

* cited by examiner

*Primary Examiner* — John Kwon
(74) *Attorney, Agent, or Firm* — Jack D. Nimz; Jeffrey P. Calfa

(57) ABSTRACT

A method of operating an engine is provided. Output of an engine speed sensor, a mass air flow sensor, an exhaust gas temperature sensor, and an engine torque estimator are monitored with an electronic control module. It is determined if the engine is operating in one of either a transient condition and a non-transient condition based upon output of at least one of the sensors and the torque estimator. Fuel injection timing is set based upon if the engine is operating in a transient condition. An exhaust gas recirculation valve position is set upon if the engine is operating in a transient condition. An intake throttle position is set based upon if the engine is operating in a transient condition. The fuel injection timing, exhaust gas recirculation valve position, and the intake throttle position are set to minimize NOx emissions when the engine is operating in a transient condition.

18 Claims, 4 Drawing Sheets

ENGINE CONTROLLING EMISSIONS DURING TRANSIENT OPERATIONS

TECHNICAL FIELD

The present disclosure relates to a system and method for controlling emissions from an internal combustion engine during transient operating conditions, and more particularly to a method for determining if an engine is operating in a transient condition, and adjusting combustion parameters during transient operating conditions as compared to steady state operating conditions.

BACKGROUND

Many modern diesel engines have an exhaust system that features an exhaust gas recirculation ("EGR") system that routes a portion of engine exhaust gas into an air intake system, such that a mixture of fresh air and engine exhaust is supplied to a combustion chamber during engine operation. EGR helps to reduce certain emissions from the engine, such as Nitrous Oxides (NOx). In addition to EGR rate, certain other engine operating parameters are also controlled in order to reduce engine emissions. These parameters include fuel injection timing, and intake air flow rates.

It has been found that controlling engine operating parameters to reduce NOx emissions has an adverse effect of increasing particulate matter emissions, Similarly, controlling engine operating parameters to reduce particulate matter emissions has an adverse effect of increasing NOx emissions. As both NOx emissions and particulate matter emissions are regulated, control of engine operating parameters must be balanced so that the engine does not produce excessive amounts of either NOx emissions or particulate matter emissions. It has been found that control of NOx emissions is more important during transient engine operations, i.e, while an engine is undergoing many engine speed changes and torque output changes, such as during acceleration, while control of particulate matter is more important during steady state operating conditions, i.e., while an engine is operating at a generally constant speed and torque output, such as during highway driving. Therefore, a need exists for a method and system to determine if an engine is operating in transient operating conditions and adjust engine operating parameters when transient operating conditions are occurring.

SUMMARY

According to one process, a method of operating an internal combustion engine having an exhaust gas recirculation system with an exhaust gas recirculation valve, a fuel injection system, an electronic control module, an engine speed sensor, an engine torque estimator, a mass air flow sensor, an exhaust gas temperature sensor, and an air intake throttle is provided. Output of the engine speed sensor, the mass air flow sensor, the exhaust gas temperature sensor, and the engine torque estimator of an engine is monitored with an electronic control module. It is determined if the engine is operating in one of either a transient condition and a non-transient condition based upon output of at least one of the engine speed sensor, the engine torque estimator, the mass air flow sensor, and the exhaust gas temperature sensor. Fuel injection timing of a fuel injection system is set based upon if the engine is operating in a transient condition. An exhaust gas recirculation valve position of an exhaust gas recirculation system is set upon if the engine is operating in a transient condition. An intake throttle position of an air intake throttle is set based upon if the engine is operating in a transient condition. The fuel injection timing, the exhaust gas recirculation valve position, and the intake throttle position are set to minimize NOx emissions when the engine is operating in a transient condition. A transition from settings for transient operation to steady state operation is controlled to limit rate of change of parameters to facilitate a smooth transition. The rate of change may occur in a linear or a non-linear manner. Rate of change of parameters is based on at least one of the engine speed sensor and the engine torque estimator.

According to one embodiment, a control system for an internal combustion engine having an exhaust gas recirculation system is provided that comprises an electronic control module, an engine speed sensor, an engine torque output estimator, a mass air flow sensor, an exhaust gas temperature sensor, an exhaust gas recirculation valve, and a fuel injector. The electronic control module has a memory and a processor. The engine speed sensor is disposed in communication with the electronic control module. The mass air flow sensor is disposed in communication with the electronic control module. The exhaust gas temperature sensor is disposed in communication with the electronic control module. The engine torque output estimator is disposed in communication with the electronic control module. The exhaust gas recirculation valve is adjustable from an open position to a closed position. The exhaust gas recirculation valve is adjusted by an exhaust gas recirculation actuator. The exhaust gas recirculation actuator is disposed in communication with the electronic control module. The fuel injector is disposed in communication with the electronic control module. The electronic control module controls a start of fuel injection time of the fuel injector. The electronic control module determines if the internal combustion engine is operating in a transient condition based upon output of the engine speed sensor and the engine torque output estimator and the electronic control module adjusts a position of the exhaust gas recirculation valve actuator when the engine is operating in a transient condition.

According to another process, a method of controlling an internal combustion engine that has an exhaust gas recirculation system, a fuel injection system, an electronic control module, an engine speed sensor, a mass air flow sensor, an exhaust gas temperature sensor, an engine torque estimator, and an air intake throttle is provided. It is determined if the engine is operating in a transient condition based upon output of at least one of the engine speed sensor, the mass air flow sensor, the exhaust gas temperature sensor, and the engine torque estimator. At least one of exhaust gas recirculation valve position, intake throttle position, and start of fuel injection timing is adjusted to a NOx emissions limiting setting when the engine is operating in a transient condition.

DETAILED DESCRIPTION

Figure 1:
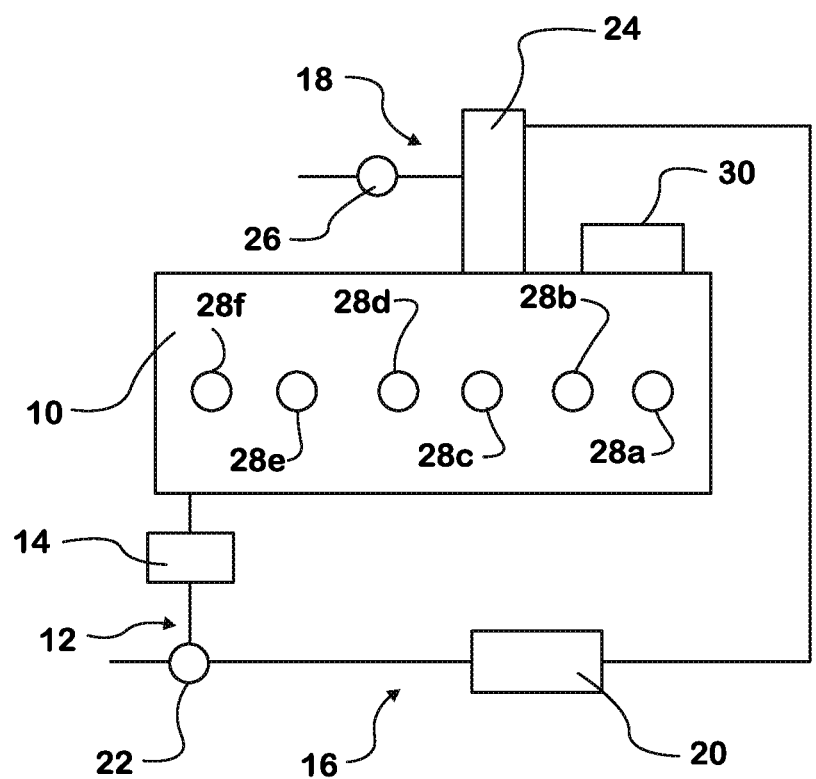
FIG. 1 is a schematic diagram showing an engine having an exhaust system with an EGR system and an air intake system.

FIG. 1 shows an engine 10 having an exhaust system 12. The exhaust system 12 comprises a turbocharger 14, having a turbine portion 14a and a compressor portion 14b, an EGR system 16, and an air intake system 18. The EGR system 16 has an EGR cooler 20 that reduces the temperature of exhaust within the EGR system 16.

The EGR system 16 additionally comprises an EGR valve 22 that controls the flow of exhaust gas to the EGR system 16. The EGR valve 22 may be electronically controlled to change an amount of exhaust gas that enters the EGR system 16. The EGR system 16 routes exhaust gas into the air intake system 18 where it enters the intake manifold and is mixed with air of atmospheric origin that has passed through an intake throttle 26. The intake throttle 26 is adapted to control an amount of atmospheric air that enters the intake manifold 24.

The engine 10 additionally has a plurality of fuel injectors 28a-28f. Each of the fuel injectors 28a-28f is disposed in a cylinder of the engine 10 and provides fuel used by that cylinder during combustion in the engine 10.

An electronic control module, sometimes referred to as an engine control module, (ECM) 30 is provided that control operations of many aspects of the engine 10, including a setting of a position of the EGR valve 22, a position of the intake throttle 26, and the timing of the fuel injection from the fuel injectors 28a-28f.

Figure 2:
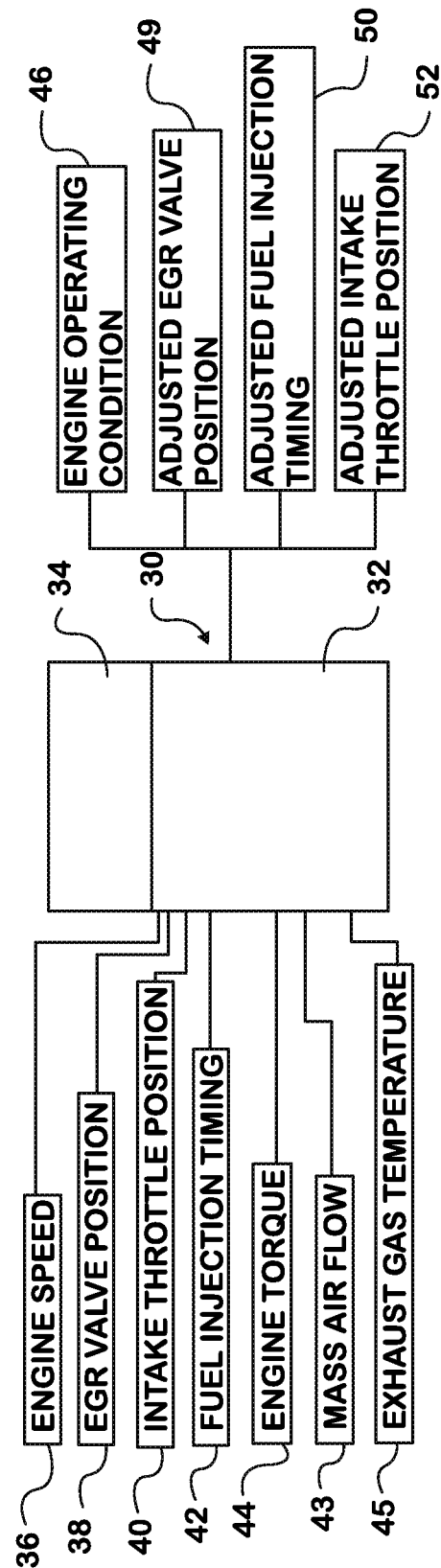
FIG. 2 is a schematic diagram showing an electronic control module and sensors used to determine engine operating state and control engine components in response to the determined operating state.

Turning now to FIG. 2, an electronic control system of the engine 10 is schematically depicted. The electronic control module 30 has a processor 32 and a memory 34. The electronic control module 30 receives inputs from a variety of sensors or controlled parameters such as an engine speed sensor 36, an EGR valve position setting 38, an intake throttle position setting 40, a fuel injection timing setting 42, a mass air flow sensor 43, an engine torque estimate 44, and an exhaust gas temperature sensor 45. The processor 32 compares the inputs with data stored in the memory 34 to determine if the engine 10 is operating in a transient condition, i.e., the engine 10 is changing speed or torque output more than a predetermined amount, or whether the engine is operating in a non-transient condition, i.e., the engine 10 is operating at a generally constant speed, and with a generally constant torque output. The ECM 30 generates a number of outputs including a determination of engine operating condition 46, and adjusted EGR valve position 48, and adjusted start of fuel injection timing 50, and an adjusted intake throttle position setting 52.

The determined engine operating condition 46 effects the setting of the remaining outputs 48-52 of the ECM 30. If the determined engine operating condition 46 indicates that the engine is operating in a transient operating condition, the ECM 30 generates outputs adapted to minimize NOx levels within the emissions of the engine 10, but may increase particulate matter emissions. However, if the determined engine operating condition 46 indicates that the engine is operating in a non-transient condition, the ECM 30 generates outputs adapted to minimize particulate matter emissions, but may increase NOx emissions. This is because during transient operating conditions, NOx emission levels are more likely to exceed desired emissions levels than particulate matter emissions levels, but during non-transient operating conditions, particulate matter emission levels are more likely to exceed desired emissions levels than NOx emission levels.

Figure 3:
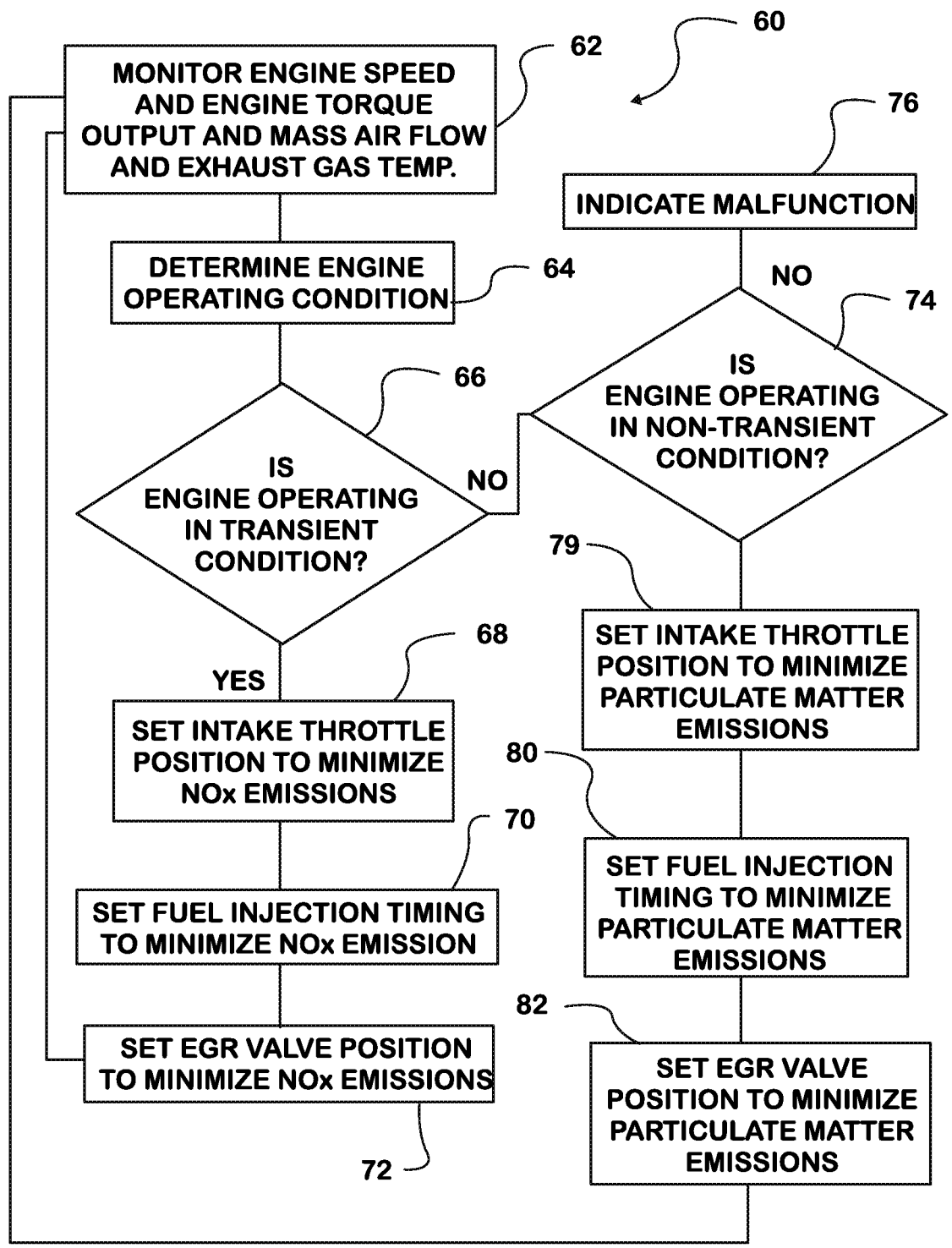
FIG. 3 is a schematic diagram showing one method of controlling an engine based upon the determined operating state.

Turning now to FIG. 3, a method 60 of operating an internal combustion engine 10 is shown according to one embodiment. The method 60 monitors engine speed, engine torque output, output of a mass air flow sensor, and output of an exhaust gas temperature sensor as shown at block 62. Next, the method 60 determines if the engine 10 is operating in a transient condition or a non-transient condition at block 64.

If the engine is determined to be operating in a transient condition at block 66, the intake throttle position is set to a position to minimize NOx emissions at block 68. Typically, the intake throttle position is set towards a closed position in order to limit an amount of atmospheric air that will be used for combustion. As shown at block 70, the fuel injection timing is also set to minimize NOx emissions during transient operations. Typically, start of fuel injection will occur later in time in order to minimize NOx emissions. Finally, when the engine is operating in transient conditions, the EGR valve position is set to minimize NOx emissions, as shown at block 72. The EGR valve position is typically set to a more open position to minimize NOx emissions, thus providing higher rates of EGR to the engine 10 during combustion.

If the engine 10 is determined not to be operating in a transient condition at block 66, the method 60 determines if the engine 10 is operating in a non-transient condition at block 74. If the method 60 determines that the engine 10 is not operating in a non-transient condition, a malfunction is indicated, as shown at block 76. If the engine is determined to be operating in a non-transient condition at block 74, the intake throttle position is set to a position to minimize particulate matter emissions at block 78. Typically, the intake throttle position is set towards an open position in order to increase the amount of atmospheric air that will be used for combustion. As shown at block 80, the fuel injection timing is also set to minimize particulate matter emissions during non-transient operations. Typically, start of fuel injection will occur earlier in time in order to minimize particulate matter emissions. Finally, when the engine is operating in non-transient conditions, the EGR valve position is set to minimize particulate matter emissions, as shown at block 82. The EGR valve position is typically set to a more closed position to minimize particulate matter emissions, thus providing lower rates of EGR to the engine 10 during combustion.

Figure 4:
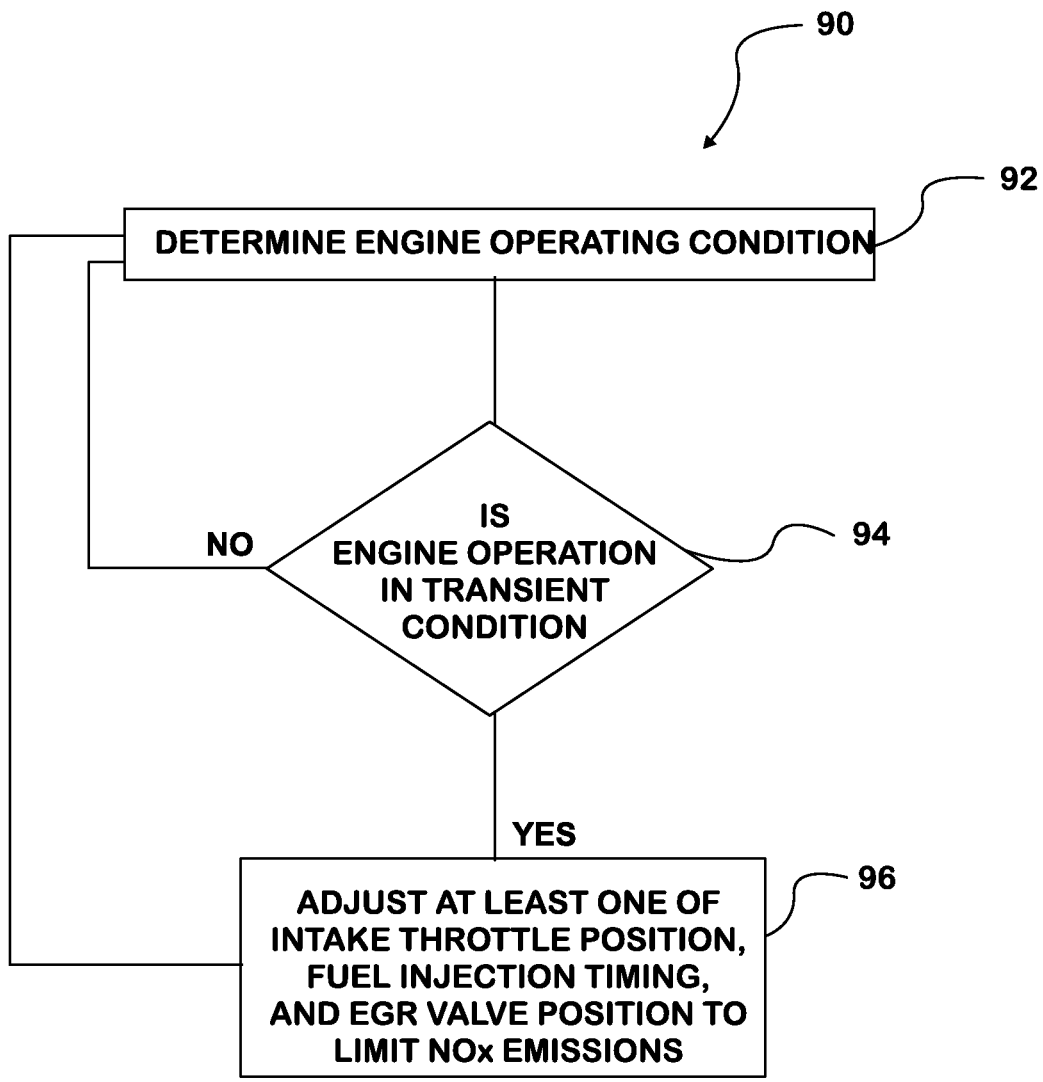
FIG. 4 is a schematic diagram showing another method of controlling an engine based upon the determined operating state.

FIG. 4 shows another embodiment of a method 90 of operating an internal combustion engine 10. If the engine 10 is determined to be operating in a transient condition at block 94, at least one of the intake throttle position, fuel injection timing, and EGR valve position are adjusted to limit NOx emissions, as shown at block 96. As mentioned above typically, the intake throttle position is set towards a closed position, the start of fuel injection will occur later in time, and the EGR valve position is set to a more open position to limit NOx emissions of the engine 10 during combustion.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical) and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A method of operating an internal combustion engine having an exhaust gas recirculation system, a fuel injection system, an electronic control module, an engine speed sensor, an engine torque estimator, a mass air flow sensor, an exhaust gas temperature sensor, and an air intake throttle, the method comprising:
monitoring output of the engine speed sensor, the mass air flow sensor, the exhaust gas temperature sensor, and the engine torque estimator of an engine with an electronic control module;
determining if the engine is operating in one of either a transient torque condition and a non-transient torque condition based upon output of at least one of the engine speed sensor, the mass air flow sensor, the exhaust gas temperature sensor, and the engine torque estimator;
setting fuel injection timing of a fuel injection system based upon if the engine is operating in a transient torque condition or a non-transient torque condition;
setting an exhaust gas recirculation valve position of an exhaust gas recirculation system upon if the engine is operating in a transient torque condition or a non-transient torque condition; and
setting an intake throttle position of an air intake throttle based upon if the engine is operating in a transient torque condition or a non-transient torque condition; wherein
the fuel injection timing, the exhaust gas recirculation valve position, and the intake throttle position are controlled to limit NOx emissions to under a pre-determined level when the engine is operating in a transient torque condition and wherein
the fuel injection timing, the exhaust gas recirculation valve position, and the intake throttle position are controlled to limit particulate matter emissions to under a pre-determined level when the engine is operating in a non-transient torque condition.

2. The method of claim 1, wherein the determining if the engine is operating in a transient condition or a non-transient torque condition is based upon changes in engine speed sensor outputs over time.

3. The method of claim 1, wherein the determining if the engine is operating in a transient condition or a non-transient torque condition is based upon changes in engine torque estimator outputs over time.

4. The method of claim 1, wherein the determining if the engine is operating in a transient condition or a non-transient torque condition is based upon changes in mass air flow sensor outputs over time.

5. The method of claim 1, wherein the determining if the engine is operating in a transient condition or a non-transient torque condition is based upon changes in exhaust gas temperature sensor outputs over time.

6. The method of claim 1, wherein the exhaust gas recirculation valve position is set to provide a higher rate of exhaust gas when the engine is operating in a transient torque condition.

7. The method of claim 1, wherein the fuel injection timing is set to inject fuel at a later time when the engine is operating in a transient torque condition.

8. The method of claim 1, wherein the intake throttle position is set to provide a reduced amount of intake air when the engine is operating in a transient torque condition.

9. The method of claim 1, wherein the exhaust gas recirculation valve position is set to provide a lower rate of exhaust gas, the fuel injection timing is set to inject fuel at an earlier time, and the intake throttle position is set to provide an increased amount of intake air when the engine is operating in a non-transient torque condition.

10. A control system for an internal combustion engine having an exhaust gas recirculation system, the control system comprising:
an electronic control module having a memory and a processor;
an engine speed sensor disposed in communication with the electronic control module;
a mass air flow sensor disposed in communication with the electronic control module;
an exhaust gas temperature sensor disposed in communication with the electronic control module;
an engine torque output estimator disposed in communication with the electronic control module;
an exhaust gas recirculation valve being adjustable between an open position and a closed position, the exhaust gas recirculation valve being adjusted by an exhaust gas recirculation actuator, the exhaust gas recirculation actuator disposed in communication with the electronic control module;
a fuel injector being disposed in communication with the electronic control module,
the electronic control module controlling a start of fuel injection time of the fuel injector; and
wherein the electronic control module determines if the internal combustion engine is operating in a transient torque condition or a non-transient torque condition based upon at least one of output of the engine speed sensor, the mass air flow sensor, the exhaust gas temperature sensor, and the engine torque output estimator, and the electronic control module controls the exhaust gas recirculation valve actuator to adjust the position of the exhaust gas recirculation valve to limit the NOx emissions below a pre-determined level when the engine is operating in a transient torque condition and further adjusts the position of the exhaust gas recirculation valve to limit particulate matter emissions below a pre-determined level when the engine is operating in a non-transient torque condition.

11. The control system for an internal combustion engine of claim 10, wherein the exhaust gas recirculation valve is adjusted to a more open position when the engine is operating in a transient torque condition.

12. The control system for an internal combustion engine of claim 10, wherein the electronic control module determines if the internal combustion engine is operating in a transient torque condition or non-transient torque condition based upon at least one of the output of the engine speed sensor, the mass air flow sensor, the exhaust gas temperature sensor, and the engine torque output estimator and the electronic control module adjusts a start of fuel injection timing to facilitate limiting the NOx emissions below a pre-determined level when the engine is operating in a transient torque condition and further limits the start of the fuel injection timing to limit the particulate matter emissions below a pre-determined level when the engine is operating in a non-transient torque condition.

13. The control system for an internal combustion engine of claim 12, wherein the start of fuel injection timing is adjusted to a later time when the engine is operating in a transient torque condition.

14. The control system for an internal combustion engine of claim 10, further comprising:
an intake throttle valve being adjustable from an open position to a closed position,
the intake throttle valve being adjusted by a throttle actuator, the throttle actuator disposed in communication with the electronic control module; and
wherein the electronic control module determines if the internal combustion engine is operating in a transient condition based upon output of the engine speed sensor and the engine torque output estimator, and the electronic control module adjusts a position of the intake throttle to
limit the NOx emissions below a pre-determined level when the engine is operating in a transient torque condition and further adjusts the position of the intake throttle actuator to limit the particulate emissions below a pre-determined level when the engine is operating in a non-transient torque condition.

15. The control system for an internal combustion engine of claim 10, wherein the intake throttle is adjusted to a less open position when the engine is operating in a transient torque condition.

16. A method of controlling an internal combustion engine having an exhaust gas recirculation system, a fuel injection system, an electronic control module, an engine speed sensor, a mass air flow sensor, an exhaust gas temperature sensor, an engine torque estimator, and an air intake throttle, the method comprising:
determining if the engine is operating in a transient condition or a non-transient condition based upon output of at least one of the engine speed sensor, the mass air flow sensor, the exhaust gas temperature sensor, and the engine torque estimator;
adjusting at least one of exhaust gas recirculation valve position, intake throttle position, and start of fuel injection timing to NOx emissions limiting setting when the engine is operating in a transient condition; and
adjusting at least one of exhaust gas recirculation valve position, intake throttle position, and start of fuel injection timing to a particulate matter emissions limiting setting when the engine is operating in a non-transient torque condition.

17. The method of claim 16, wherein the exhaust gas recirculation valve position is adjusted to a more open position in the NOx limiting setting compared to the particulate matter limiting position.

18. The method of claim 16, wherein the start of fuel injection timing is adjusted to a later time in the NOx limiting setting compared to the particulate matter limiting setting.

* * * * *